US007884712B2

(12) United States Patent
Nierenberg et al.

(10) Patent No.: US 7,884,712 B2
(45) Date of Patent: *Feb. 8, 2011

(54) WIRELESS TRACKING SYSTEM AND METHOD UTILIZING TAGS WITH VARIABLE POWER LEVEL TRANSMISSIONS

(75) Inventors: Nicolas C Nierenberg, La Jolla, CA (US); Dyami Caliri, Encinitas, CA (US)

(73) Assignee: Awarepoint Corporation, San Diego, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 12/114,740

(22) Filed: May 2, 2008

(65) Prior Publication Data

US 2008/0278327 A1 Nov. 13, 2008

Related U.S. Application Data

(60) Provisional application No. 60/916,737, filed on May 8, 2007.

(51) Int. Cl.
*G08B 5/32* (2006.01)
*G01S 19/24* (2010.01)

(52) U.S. Cl. ........................... 340/539.13; 340/539.11; 340/539.21; 340/573.4; 340/825.49; 455/456.1

(58) Field of Classification Search ................ 340/10.1, 340/10.3, 10.4, 539.13, 825.49, 572.1, 572.4, 340/573.1, 573.3, 573.4, 539.11, 539.21–539.23, 340/539.32; 342/357.01, 463; 455/456.1
See application file for complete search history.

(56) References Cited

U.S. PATENT DOCUMENTS

| | | | |
|---|---|---|---|
| 6,697,417 B2 | 2/2004 | Fernandez-Corbaton et al. | |
| 6,701,615 B2 | 3/2004 | Harding et al. | |
| 6,756,901 B2 * | 6/2004 | Campman | 340/573.1 |
| 7,082,286 B2 | 7/2006 | Kaewell, Jr. et al. | |
| 7,317,377 B2 * | 1/2008 | Galperin et al. | 340/5.64 |
| 7,423,535 B2 * | 9/2008 | Chung et al. | 340/572.4 |
| 7,495,551 B2 * | 2/2009 | Waxman | 340/539.1 |
| 7,504,928 B2 * | 3/2009 | Nierenberg et al. | 340/10.3 |
| 2002/0102988 A1 | 8/2002 | Myllymaki | |
| 2003/0225893 A1 | 12/2003 | Roese et al. | |
| 2006/0049250 A1 * | 3/2006 | Sullivan | 235/385 |
| 2006/0055552 A1 | 3/2006 | Chung et al. | |
| 2006/0267833 A1 | 11/2006 | Langford et al. | |
| 2007/0194923 A1 * | 8/2007 | Karr | 340/572.1 |
| 2009/0251313 A1 * | 10/2009 | Perkins et al. | 340/539.13 |

OTHER PUBLICATIONS

Written Opinion of the International Searching Authority for International Application No. PCT/US2008/062709, Date of mailing Oct. 28, 2008.

* cited by examiner

*Primary Examiner*—George A Bugg
*Assistant Examiner*—Anne V Lai
(74) *Attorney, Agent, or Firm*—Clause Eight IPS; Michael Catania

(57) ABSTRACT

The present invention provides a solution to mistaken location calculations based on multipath effects. The present invention utilizes tags attached to objects that transmit signals at various power levels for reception by sensors stationed throughout a facility. Sensor readings at the various power levels are utilized to determine the location of the tagged object.

4 Claims, 8 Drawing Sheets

WIRELESS TRACKING SYSTEM AND METHOD UTILIZING TAGS WITH VARIABLE POWER LEVEL TRANSMISSIONS

CROSS REFERENCES TO RELATED APPLICATIONS

The Present Application claims priority to U.S. Provisional Application No. 60/916,737, filed on May 8, 2007.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a system and method for mitigating multipath errors associated with the wireless tracking of objects by utilizing tags that transmit signals at various power levels.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives, the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects, each of which transmits a signal, multiple receivers for receiving the transmissions from the tagged objects, and a processing means for analyzing the transmissions to determine the locations of the tagged objects within a predetermined environment.

Several prior art references discloses various tracking systems.

McKee et al., U.S. Pat. No. 6,915,135 discloses a system for determining presence, identity and duration of presence in a given area (a table in a restaurant) of an object (tag attached to a waiter).

Lester, U.S. Pat. No. 3,805,265 discloses a location system that uses line-of-sight radiant wave energy for signal transmission.

Schwengler U.S. Pat. No. 7,050,819, is directed at the problem of adequate power for a mobile telephone for a two-way communication function or a regeneration function as a node of a mesh network.

Christ, U.S. Pat. No. 5,977,913, discloses a radio frequency system that is utilized within a prison and allows for an individual to be located after an alarm is triggered by the individual.

Zodnik, U.S. Patent Publication Number 2004/0147232, discloses wall-mounted (RJ-11 or RJ-45) wireless transceivers configured to only track the location of a self-identified wireless communication device in order to communicate the location of the self-identified wireless communication device to an emergency service such as 911.

One exemplary method triangulates the strongest received signals to determine the location of a tagged object. This method is based on the assumption that the receivers with the strongest received signals are the ones located closest to the tagged object. However, such an assumption is sometimes erroneous due to common environmental obstacles. Multipath effects can result in a further located receiver having a stronger received signal from a tagged object than a more proximate receiver to the tagged object, which can result in a mistaken location determination. The prior art has disclosed various means for overcoming multipath effects.

Tekinay, U.S. Pat. No. 6,259,894 for a Method For Improved Line-Of-Sight Signal Detection Using RF Model Parameters, discloses a method for reducing time-shift due to multipathing for a RF signal in an RF environment.

Close, U.S. Pat. No. 3,869,673 for a Method And Apparatus For Measuring Multipath Distortion, discloses a method for indicating multipath distortion in a received signal.

Lennen, U.S. Pat. No. 5,402,450 for a Signal Timing Synchronizer, discloses a method and apparatus for reducing the effects of multipath induced distortions on the accuracy of detecting the time of arrival of a received signal.

Fortune et al., U.S. Pat. No. 5,450,615 for a Prediction Of Indoor Electromagnetic Wave Propagation For Wireless Indoor Systems, discloses techniques for predicting RF propagation within a structure.

Other prior art references have disclosed the use of varying energy levels. For instance, Nakanishi, U.S. Pat. No. 5,451,847 for a Variable Energy Radio Frequency Quadrupole Linac discloses changing radio frequency energy levels to emitted focused and accelerated beams.

Kaewell, Jr. et al., U.S. Pat. No. 7,082,286 for a Path Searcher Using Reconfigurable Correlator Sets discloses producing a path profile for a user based on sorted output energy levels.

Fernabdez-Cobaton et al., U.S. Pat. No. 6,697,417 for a System And Method Of Estimating Earliest Arrival Of CDMA Forward And Reverse Link Signals discloses a mobile station receiver that detects the arrival times and energy levels of received signals, and constructs a searcher histogram and a finger histogram associated with each pilot signal.

The prior art has yet to resolve mistaken location calculations based on multipath effects for objects tracked within an indoor facility.

BRIEF SUMMARY OF THE INVENTION

The present invention provides a solution to mistaken location calculations based on multipath effects. The present invention utilizes tags attached to objects that transmit signals at various power levels for reception by sensors stationed throughout a facility.

One aspect of the present invention is a method for determining a real-time location of an object within an indoor facility utilizing a tag that transmits at three different power levels. The tag is attached to the object to be located using the method. A first reading set is generated from a primary plurality of sensor readings transmitted from a tag at a first energy level. A second reading set is generated from a secondary plurality of sensor readings transmitted from the tag at a second energy level. A third reading set is generated from a tertiary plurality of sensor readings transmitted from the tag at a third energy level. Next, each of the first, second and third reading sets is sorted into a plurality of physical regions. Next, a first physical region of the plurality of physical regions is selected for each of the first, second and third energy levels. Each of the first physical regions is composed of a first plurality of sensor readings having the highest average signal strength for each of the first, second and third energy levels. Next, the first plurality of sensor readings is sorted into a second plurality of sensor readings for each of the first, second and third energy levels. Each of the second plurality of sensor readings corresponds to a zone within each of the first physical regions. Next, a selected zone having the highest average reading for each of the first, second and third energy levels is selected. Next, a real-time location of the object is calculated from a plurality of the highest sensor readings from the second plurality of sensor readings corresponding to the selected zone for each of the first, second and third energy levels. Finally, the real-time locations for each of the first, second and third energy levels are compared to determine a true real-time location of the object. The comparison can include a hypotheses function which includes determining if motion was detected by a motion sensor on the tag, or the comparison may include a confidence factor for each energy level in each zone or region based on previous energy level values for particular locations.

In another aspect of the present invention is a method for determining a real-time location of an object within an indoor facility. The method begins with obtaining a plurality of sensor readings from a tag attached to the object. The plurality of sensor readings comprises sensor readings at a plurality of energy levels. Next, a reading set is generated from the plurality of sensor readings. The reading set is then sorted by a plurality of physical regions. Then, a first physical region is selected from the plurality of physical regions. The first physical region is composed of a first plurality of sensor readings that have the highest average signal strength. Next, the first plurality of sensor readings is sorted into a second plurality of sensor readings. Each of the second plurality of sensor readings corresponds to sensor located in a zone within the first physical region. A selected zone having the highest average reading is then selected. Next, a real-time location of the object is calculated using only the second plurality of sensor readings that correspond to the selected zone.

In this aspect of the present invention, the sensor readings preferably comprise signal strength, link quality, timestamp and identification of the tag. The method may also include displaying the new real-time location of the object on a graphical user interface. The method may also include comparing the calculated real-time location of the object for each of the first, second and third energy levels to a previously calculated location for the object. The method may also include monitoring the motion state of the object to confirm movement of the object from the previously calculated location to the new real-time location.

In this aspect of the invention, the indoor facility is preferably a hospital, each of the plurality of physical regions is a floor of the hospital, and the selected zone is a room on a floor of the hospital. Alternatively, the selected zone is a group of rooms on floor of the hospital. The plurality of sensor readings of the reading set preferably comprises from eight to thirty sensor readings for the tag, and each of the plurality of sensor readings originates from a single stationary sensor positioned within the indoor facility. Each of the plurality of sensor readings is preferably based on a radio frequency transmission from the tag.

In this aspect of the present invention, obtaining a plurality of sensor readings from a tag attached to the object includes first, transmitting a radio frequency transmission from the tag comprising a sequence number, a set of flags and identification of the tag. Next, the radio frequency transmission is received at a plurality of stationary sensors positioned within the indoor facility. Finally, the signal strength, the link quality, the time of transmission and the identification of the tag are transmitted from each of the plurality of stationary sensors to a server for processing.

Another aspect of the present invention is a system for providing real-time location information for a plurality of non-stationary objects within an indoor facility. The system includes a plurality of stationary sensors, a plurality of tags and means for processing tag specific data. Each of the plurality of stationary sensors is positioned within the indoor facility. Each of the plurality of tags is attached to one of the plurality of non-stationary objects. Each of the plurality of tags has means for wirelessly transmitting to each of the plurality of stationary sensors tag specific data at least three different energy levels. The processing means processes the tag specific data at each of the three different energy levels to obtain a real-time first plurality of sensor readings for the tag at a first energy level, a real-time second plurality of sensor readings for the tag at a second energy level, and a real-time third plurality of sensor readings for the tag at a third energy level. The information is processed in order to select a physical region within the indoor facility having sensor readings from each of the first plurality of sensor readings, second plurality of sensor readings and third plurality of sensor readings. This information is processed to calculate the position of an object from the sensor readings positioned within the selected physical region.

In this aspect of the present invention, the processing means is preferably a server in communication with the plurality of stationary sensors through at least one bridge. Each of the plurality of tags preferably transmits a radiofrequency transmission of approximately 2.48 GigaHertz, and each of the plurality of stationary sensors communicates utilizing an 802.15.4 protocol. The system also may include means for eliminating sensor readings not associated with the selected zone. Alternatively, the each of the plurality of tags communicate using an 802.15.4 protocol.

Another aspect of the present invention is a method for determining a real-time location of an object within an indoor facility utilizing tags transmitting at least three different power levels. A first plurality of sensor readings is obtained from a tag attached to the object. Each of the first plurality of sensor readings transmitted from the tag at a first energy level. Next, a second plurality of sensor readings is obtained from the tag attached to the object. Each of the second plurality of sensor readings transmitted from the tag at a second energy level. The second energy level is different from the first energy level. Next, a third plurality of sensor readings is obtained from the tag attached to the object. Each of the third plurality of sensor readings is transmitted from the tag at a third energy level. The third energy level is different from the second energy level and the first energy level. Next, a first physical region of a plurality of physical regions for each of the first, second and third energy levels is selected. The first physical region is composed of a first plurality of sensor readings having the highest average signal strength for each of the first, second and third energy levels. Next, the first plurality of sensor readings is sorted into a second plurality of sensor readings for each of the first, second and third energy levels. Each of the second plurality of sensor readings corresponds to a zone within the first physical region. Next, a selected zone having the highest average reading for each of the first, second and third energy levels is selected. Next, preliminary locations of the object are calculated from a plurality of the highest sensor readings from the second plurality of sensor readings corresponding to the selected zone for each of the first, second and third energy levels. Finally, each of the preliminary locations for each of the first, second and third energy levels are analyzed to determine a new real-time location of the object.

Yet another aspect of the present invention is a method for determining a real-time location of an object within an indoor facility by calculating and comparing preliminary locations for the object. A first preliminary location of the object is calculated from a first plurality of sensor readings for a tag generated at a first power level. Next, a second preliminary location of the object is calculated from a second plurality of sensor readings for the tag generated at a second power level. The second power level is less than the first power level. Next, a third preliminary location of the object is calculated from a third plurality of sensor readings for the tag generated at a third power level. The third power level is less than the second power level. Next, the first preliminary location of the object, the second preliminary location of the object, and the third preliminary location of the object are analyzed to determine a real-time location of the object within the indoor facility.

This aspect of the present invention preferably has the second power level at 50% of the first power level and the third power level at 25% of the first power level.

In this aspect of the invention, calculating the first preliminary location preferably includes first generating a first reading set from a primary plurality of sensor readings transmitted from the tag at the first energy level. The tag attached to the object. Next, sorting the first reading set by a plurality of primary physical regions. Next, a first primary physical region of the plurality of primary physical regions is selected. The first physical region composed of a first plurality of sensor readings having a highest average signal strength from the first reading set. Next, the first plurality of sensor readings is sorted into a second plurality of sensor readings. The second plurality of sensor readings corresponds to a zone within the first primary physical region. Next, a selected primary zone having the highest average reading from the second plurality of sensor readings is selected. Finally, the first preliminary location of the object is calculated from a plurality of the highest sensor readings from the second plurality of sensor readings corresponding to the selected primary zone.

In this aspect of the invention, calculating the second preliminary location preferably includes generating a second reading set from a secondary plurality of sensor readings transmitted from the tag at the second energy level. Next, the second reading set is sorted by a plurality of secondary physical regions. Next, a first secondary physical region of the plurality of secondary physical regions is selected. The first secondary physical region is composed of a first plurality of sensor readings having a highest average signal strength from the second reading set. Next, the first plurality of sensor readings is sorted into a second plurality of sensor readings. The second plurality of sensor readings corresponds to a zone within the first secondary physical region. Next, a selected secondary zone having the highest average reading is selected from the second plurality of sensor readings. Finally, the second preliminary location of the object is calculated from a plurality of the highest sensor readings from the second plurality of sensor readings corresponding to the selected secondary zone.

In this aspect calculating the third preliminary location includes generating a third reading set from a tertiary plurality of sensor readings transmitted from the tag at the third energy level. Next, the third reading set is sorted by a plurality of tertiary physical regions. Next, a first tertiary physical region of the plurality of tertiary physical regions is selected. The first tertiary physical region composed of a first plurality of sensor readings having a highest average signal strength from the third reading set. Next, the first plurality of sensor readings is sorted into a second plurality of sensor readings. The second plurality of sensor readings corresponds to a zone within the first tertiary physical region. Next, a selected tertiary zone having the highest average reading from the second plurality of sensor readings is selected. Finally, the third preliminary location of the object is calculated from a plurality of the highest sensor readings from the second plurality of sensor readings corresponding to the selected tertiary zone.

In this aspect of the present invention, the first power level is 1 milli-Watt, the second power level is 0.5 milli-Watt, and third power level is 0.25 milli-Watt.

In this aspect of the present invention, analyzing the first preliminary location of the object, the second preliminary location of the object, and the third preliminary location of the object to determine a real-time location of the object within the indoor facility includes determining a zone within the indoor facility that contains the first preliminary location of the object, the second preliminary location of the object, and the third preliminary location of the object. Next, the real-time location of the object is calculated from the position of sensors within the zone utilizing a radial basis function. The real-time location is preferably provided as an X-Y position.

Yet another aspect of the present invention is a method for determining a real-time location of an object within an indoor facility by obtaining sensor readings at a plurality of power levels. First, a plurality of preliminary locations of the object is calculated. Each of the plurality of preliminary locations is generated from a plurality of sensor readings set at a unique power level. Each of the plurality of preliminary locations of the object is analyzed to determine a real-time location of the object within the indoor facility.

In this aspect of the present invention, the plurality of preliminary locations preferably ranges from two to ten, and the unique power levels range from two to ten.

In this aspect of the present invention, analyzing each of the plurality of preliminary locations of the object to determine a real-time location of the object within the indoor facility includes determining a zone within the indoor facility that contains each of the plurality of locations of the object. Next, the real-time location of the object from a position of a plurality of sensors within the zone is calculated utilizing a radial basis function. Each unique power level is preferably at least 10% different than any other unique power level.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
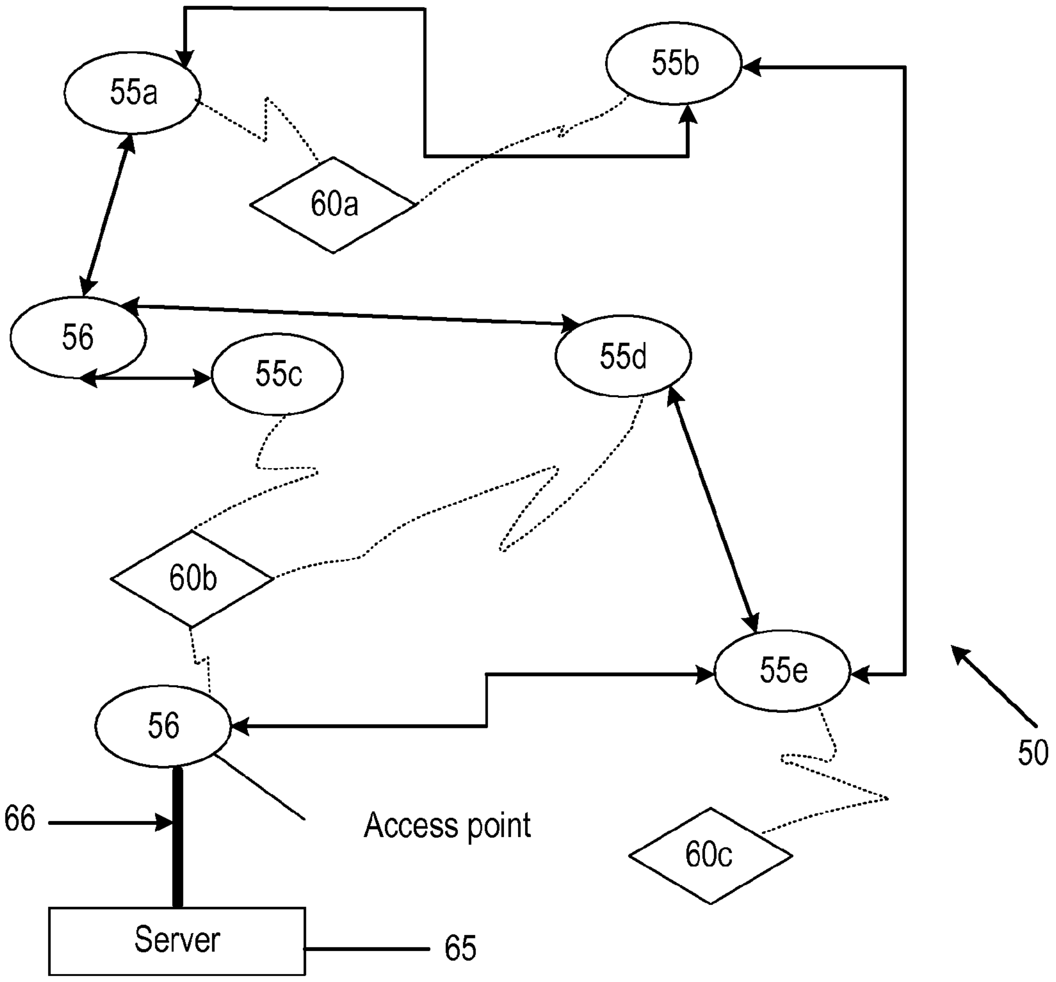
FIG. 1 is schematic view of a system of the present invention.

As shown in FIGS. 1-4, a system for tracking objects within an indoor facility is generally designated 50. The system 50 is capable of determining real-time location of an object 100 within an indoor facility 70. The system 50 preferably includes a plurality of sensors 55, a plurality of bridges 56, a plurality of tags 60 and at least one server 65. One example of the components of the system 50 is disclosed in U.S. Pat. No. 7,197,326, for a Wireless Position Location And Tracking System, which is hereby incorporated by reference in its entirety. A more specific example of the sensors 55 is disclosed in U.S. Pat. No. 7,324,824, for a Plug-In Network Appliance, which is hereby incorporated by reference in its entirety. Another example of a system 50 is set forth in U.S. Pat. No. 6,751,455 for a Power- And Bandwidth-Adaptive In-Home Wireless Communications System With Power-Grid-Powered Agents And Battery-Powered Clients, which is hereby incorporated by reference in its entirety.

The system 50 is preferably employed within an indoor facility 70 such as a business office, factory, home, hospital and/or government agency building. The system 50 is utilized to track and locate various objects positioned throughout the facility 70. The tags 60 continuously transmit signals on a predetermined time cycle, and these signals are received by sensors 55 positioned throughout the facility 70. As discussed below, in order to mitigate multipath effects, the tags 60 transmit signals at various power levels. The sensors 55 transmit the data from the tags 60 to a bridge 56 for transmission to a server 65. If a sensor 55 is unable to transmit to a bridge 56, the sensor 55 may transmit to another sensor 55 in a mesh network-like system for eventual transmission to a bridge 56. In a preferred embodiment, a transmission may be sent from a transmission distance of six sensors 55 from a bridge 56. The server 65 preferably continuously receives transmissions from the sensors 55 via the bridges 56 concerning the movement of objects 100 bearing a tag 60 within the facility 70. The server 65 processes the transmissions from the sensors 55 and calculates a real-time position for each of the objects 100 bearing a tag 60 within the facility 70. The real-time location information for each of the objects 100 bearing a tag 60 is preferably displayed on an image of a floor plan of the indoor facility 70, or if the facility 70 has multiple floors, then on the floor plan images of the floors of the facility 70. The floor plan image may be used with a graphical user interface of a computer, personal digital assistant, or the like so that an individual of the facility 70 is able to quickly locate objects 100 within the facility 70.

As shown in FIG. 1, the system 50 utilizes sensors 55 to monitor and identify the real-time position of non-stationary objects bearing or integrated with tags 60. The sensors 55*a-f* preferably wirelessly communicate with each other (shown as double arrow lines) and with a server 65 through a wired connection 66 via at least one bridge 56, such as disclosed in the above-mentioned U.S. Pat. No. 7,324,824 for a Plug-In Network Appliance. The tags 60*a-c* transmit signals at various power levels (shown as dashed lines) which are received by the sensors 55*a-e*, which then transmit signals to bridges 56 for eventual transmission to a server 65. The server 65 is preferably located on-site at the facility 70. However, the system 50 may also include an off-site server 65, not shown.

Each tag 60 preferably transmits a radio frequency signal of approximately 2.48 GigaHertz ("GHz"). The communication format is preferably IEEE Standard 802.15.4. Each tag 60 preferably transmits at a plurality of tag transmission power levels, preferably ranging from two to ten different tag transmission power levels (energy levels). The number of tag transmission power levels varies depending on data transmission constraints and time constraints for the system. A most preferred tag 60 transmits at three different tag transmission power levels. In one preferred embodiment, the first power level is approximately 1 milli-Watt, the second power level is approximately 0.5 milli-Watt, and the third power level is approximately 0.25 mill-Watt. In a preferred embodiment, the tag 60 transmits each signal at a different power level before transmitting again at the original power level. For example, the tag 60 transmits a first signal at a first power level, the next signal at a second power level, the next signal at a third power level, the next signal at the first power level, . . . etc. Those skilled in the pertinent art will recognize that the tags 60 may operate at various frequencies without departing from the scope and spirit of the present invention.

Figure 2:
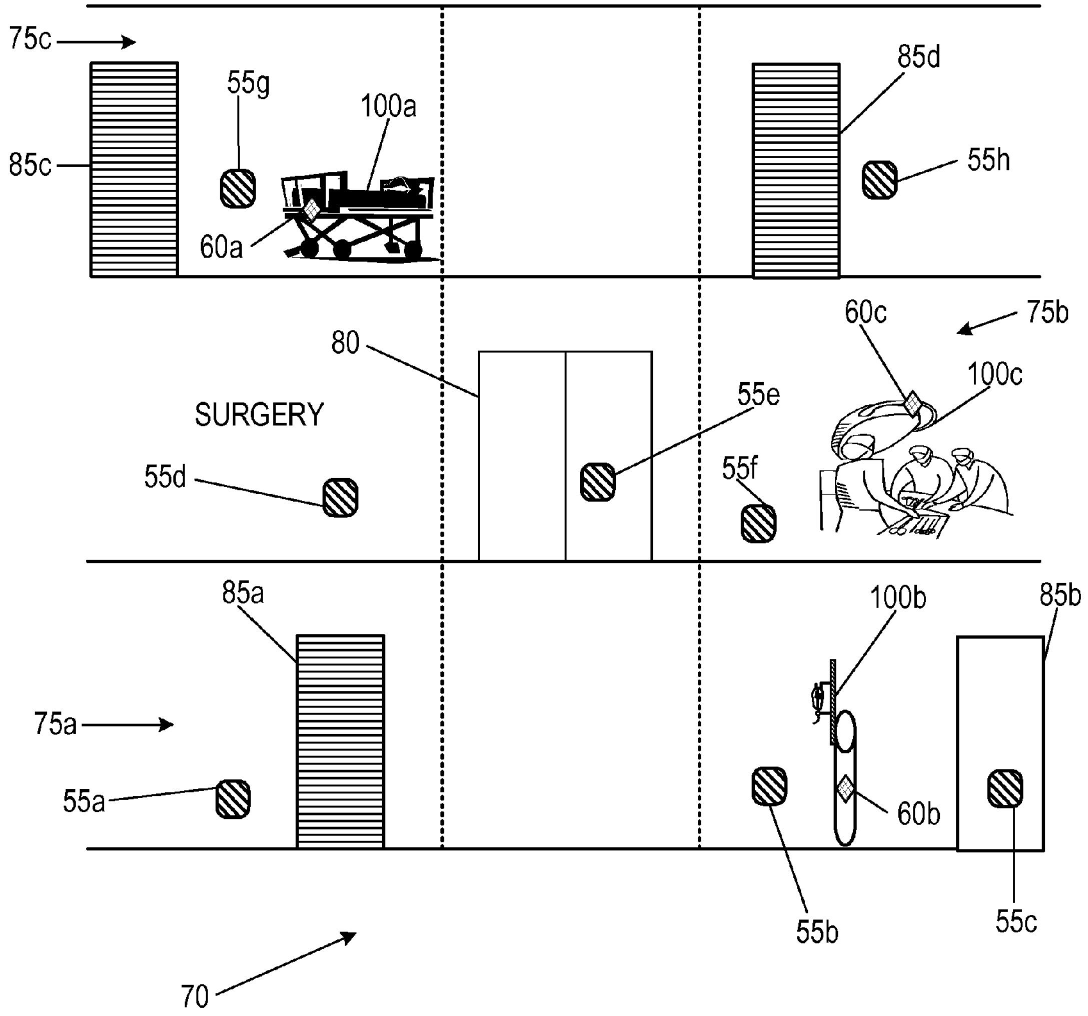
FIG. 2 is a multi-floor view of a facility employing the system of the present invention.
Figure 3:
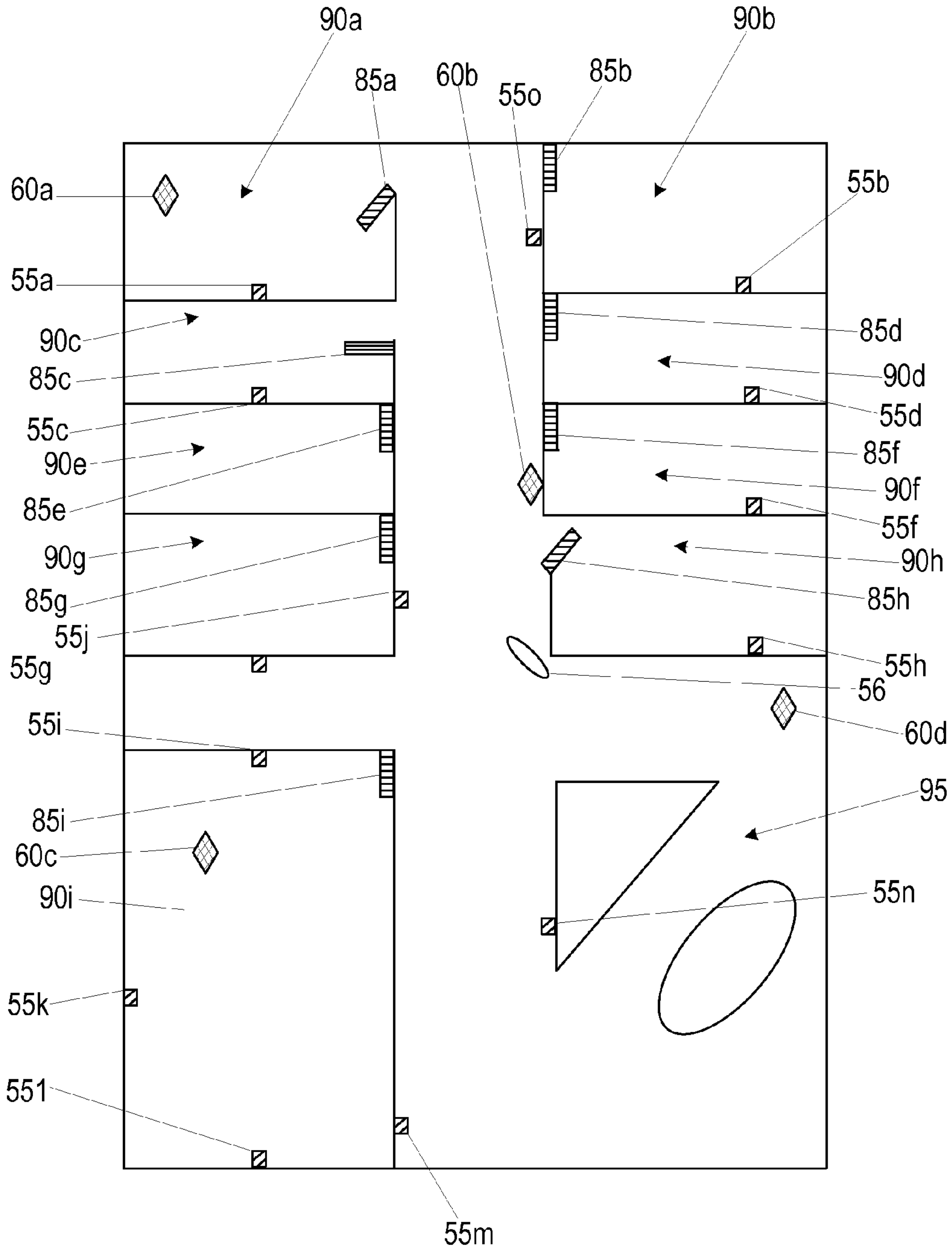
FIG. 3 is a floor plan view of a single floor in a facility employing the system of the present invention.
Figure 4:
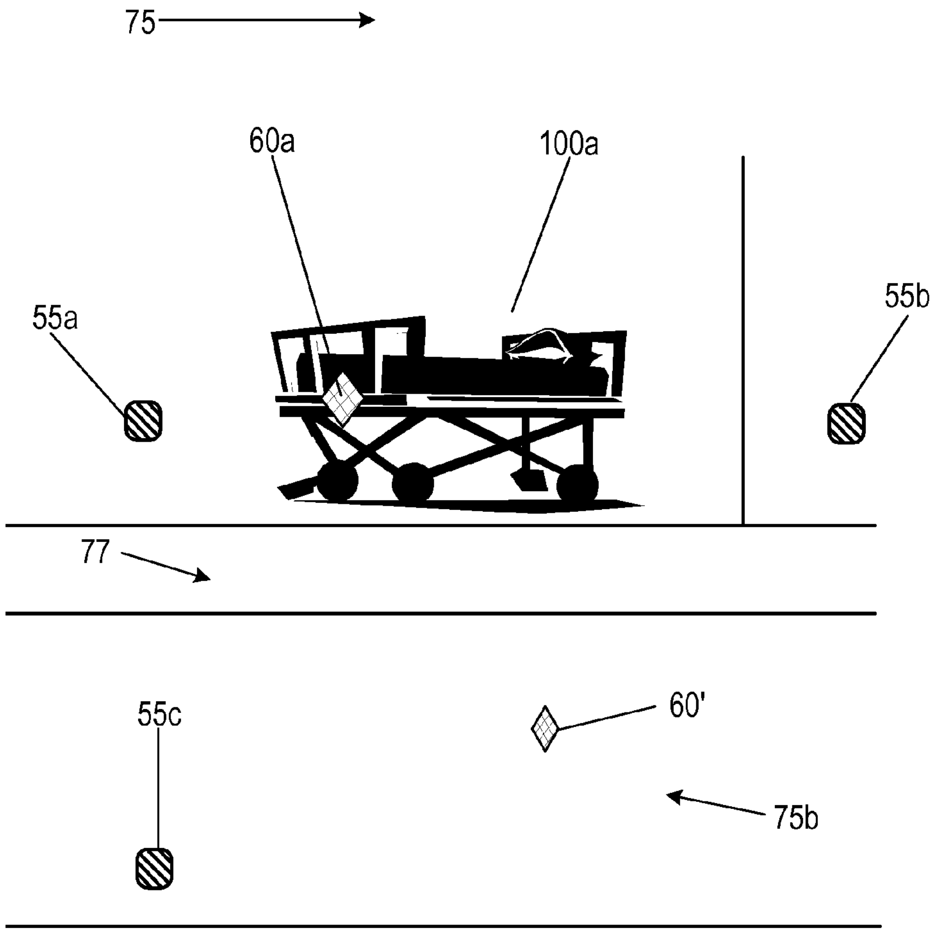
FIG. 4 is a two-floor view of a facility including a tagged object and sensors of the system of the present invention.

As shown in FIGS. 2-4, the facility 70 is depicted as a hospital. The facility 70 has a multitude of floors 75*a-c*. An elevator 80 provides access between the various floors 75*a*, 75*b* and 75*c*. Each floor 75*a*, 75*b* and 75*c* has a multitude of rooms 90*a-i*, with each room 90 accessible through a door 85. Positioned throughout the facility 70 are sensors 55*a-o* for obtaining readings from tags 60*a-d* attached to or integrated into non-stationary objects 100*a*, 100*b* (see FIGS. 2 and 4). A bridge 56 is also shown for receiving transmissions from the sensors 55 for processing by the server 65.

As shown in FIG. 4, the tag 60*a* is attached to movable bed 100*a* positioned on an upper floor 75*c*. The tag 60*a* transmits a signal which is received by sensors 55*a*, 55*b* and 55*c*. If the signal to sensor 55*c* is the strongest, then an analysis of the readings from the sensors 55*a-c* may place the tag 60*a*, and thus the movable bed 100*a*, at position 60' on the lower floor 75*b*. This type of faulty reading would likely occur with triangulation. To prevent such a faulty positioning reading, the present invention processes the readings preferably according to one of the methods illustrated in FIGS. 5-7, which would eliminate the reading from sensor 55*c* from the location calculation for movable bed 100*a*.

Figure 5:
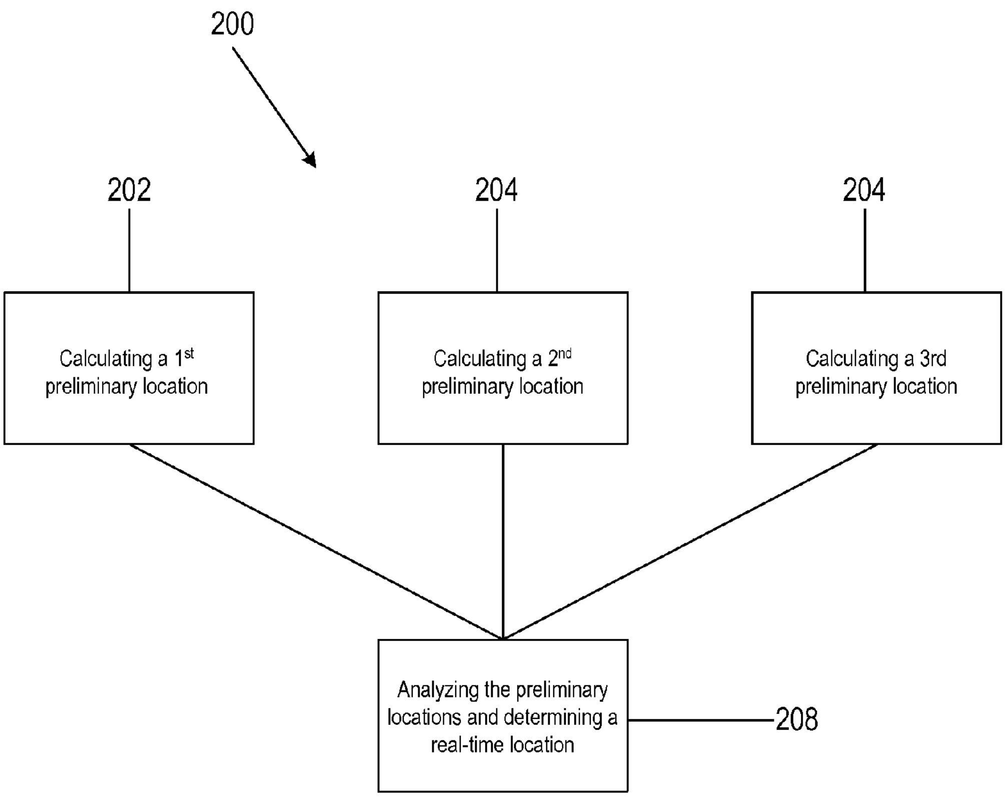
FIG. 5 is a flow chart of a general method of the present invention.

A general method 200 of the present invention is illustrated in FIG. 5. At block 202, a first preliminary location of the object 100 is calculated utilizing sensor readings transmitted by a tag 60 attached to the object 100, with the tag 60 transmitting at a first power level. At block 204, a second preliminary location of the object 100 is calculated utilizing sensor readings transmitted by the tag 60 attached to the object 100, with the tag 60 transmitting at a second power level. The second power level is different than the first power level. At block 206, a third preliminary location of the object 100 is calculated utilizing sensor readings transmitted by the tag 60 attached to the object 100, with the tag 60 transmitting at a third power level. The third power level is different than the first power level and the second power level. At block 208, the first, second and third preliminary locations are analyzed to determine a real-time location of the object 100 within the indoor facility 70. Those skilled in the pertinent art will recognize that the method could include only sensor readings at two different power levels, or the method could include sensor readings at more than two different power levels depending on the data transmission constraints and time constraints of the system. Sensor readings from two to thirty different tag transmission power levels is within the scope and spirit of the present invention.

Figure 6:
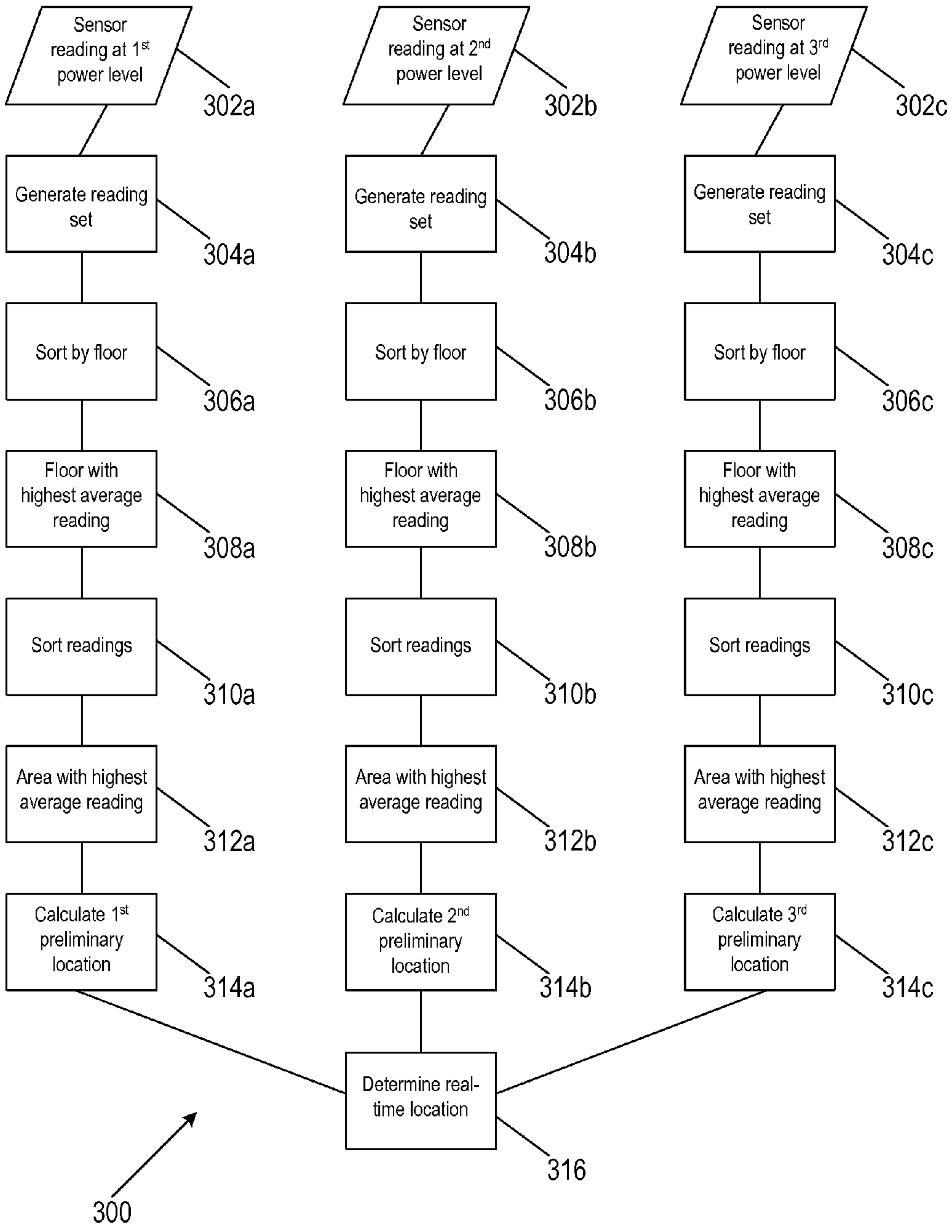
FIG. 6 is a flow chart of a specific method of the present invention.
Figure 8:
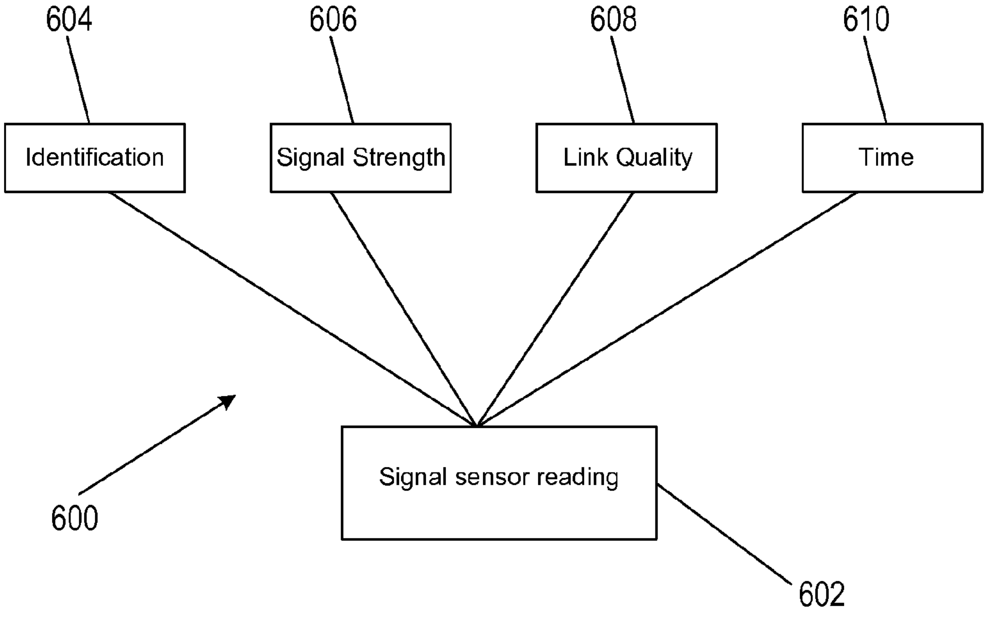
FIG. 8 is a flow chart of a single sensor reading input.

A more specific method 300 of the present invention is set forth in FIG. 6. At blocks 302*a*, 302*b* and 302*c*, the sensors 55 of the system 50 generate readings from a tag 60 at three different power levels. At block 302*a*, sensor readings are generated from the tag 60 at a first power level. At block 302*b*, sensor readings are generated from the tag 60 at a second power level. At block 302*c*, sensor readings are generated from the tag 60 at a third power level. The sensor reading inputs 600 are illustrated in and discussed with reference to FIG. 8. At blocks 304*a*, 304*b* and 304*c*, reading sets are generated for readings from the single tag 60. The generation of the reading set is typically in response to an inquiry from a user of the system 50 in search of an object 100 bearing tag 60. The server 65 typically determines if there is sufficient data to proceed with the location analysis. If there is insufficient data, the method is restarted at blocks 302*a*, 302*b* and 302*c*. If there is sufficient data, then the method proceeds to blocks 308*a* 308*b* and 308*c*. At blocks 308*a*, 308*b* and 308*c*, the reading sets are separated by floor 75 of the facility 70. At blocks 310*a*, 310*b* and 310*c*, the floor 75 with the highest average reading set is selected for further processing, and the readings for the selected floor are sorted by zones. Each zone may represent any physical boundary on the selected floor 75 of the facility 70. Preferably, the zones represent a room 90, station 95 or other easily determined physical location. At blocks 312*a*, 312*b* and 312*c*, the zone with the highest average reading is selected. At block 314*a*, a first preliminary location for the object 100 is calculated based on the readings generated from the tag 60 at the first power level. At block 314*b*, a second preliminary location for the object 100 is calculated based on the readings generated from the tag 60 at the second power level. At block 314*c*, a third preliminary location for the object 100 is calculated based on the readings generated from the tag 60 at the third power level. At block 316, the real-time location of the object 100 is determined based on an analysis of the first, second and third preliminary locations of the object 100. Once the real-time location is determined, the location can be inputted into a location database for dissemination to users of the system 50 in the future.

Figure 7:
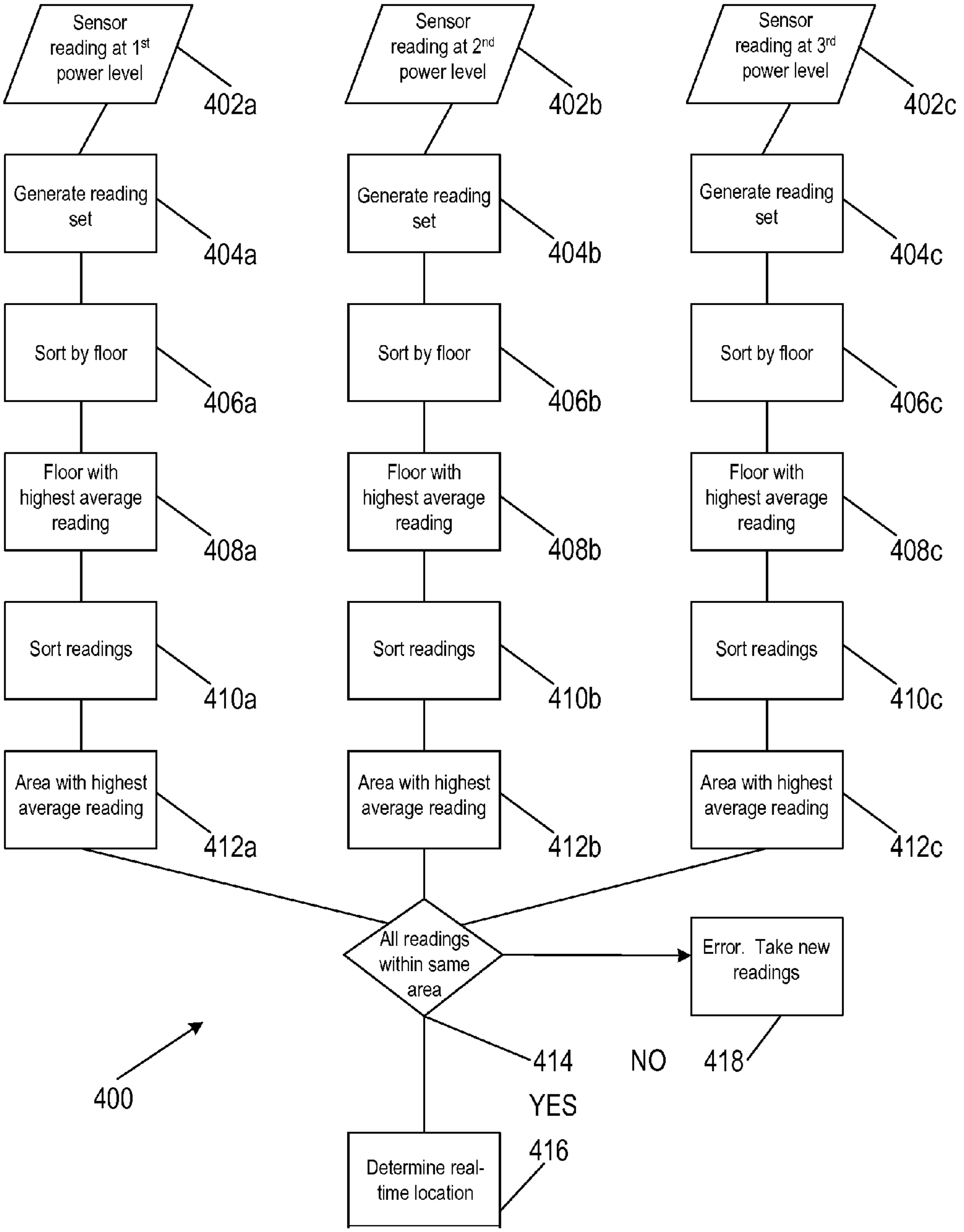
FIG. 7 is a flow chart of a specific method of the present invention.

An alternative specific method 400 of the present invention is set forth in FIG. 7. At blocks 402*a*, 402*b* and 402*c*, the sensors 55 of the system 50 generate readings from a tag 60 at three different power levels. At block 402*a*, sensor readings are generated from the tag 60 at a first power level. At block 402*b*, sensor readings are generated from the tag 60 at a second power level. At block 402*c*, sensor readings are generated from the tag 60 at a third power level. The sensor reading inputs 600 are illustrated in and discussed with reference to FIG. 8. At blocks 404*a*, 404*b* and 404*c*, reading sets are generated for readings from the single tag 60. The generation of the reading set is typically in response to an inquiry from a user of the system 50 in search of an object 100 bearing tag 60. The server 65 typically determines if there is sufficient data to proceed with the location analysis. If there is insufficient data, the method is restarted at blocks 402*a*, 402*b* and 402*c*. If there is sufficient data, then the method proceeds to blocks 408*a* 408*b* and 408*c*. At blocks 408*a*, 408*b* and 408*c*, the reading sets are separated by floor 75 of the facility 70. At blocks 410*a*, 410*b* and 410*c*, the floor 75 with the highest average reading set is selected for further processing, and the readings for the selected floor are sorted by zones. Each zone may represent any physical boundary on the selected floor 75 of the facility 70. Preferably, the zones represent a room 90, station 95 or other easily determined physical location. At blocks 412*a*, 412*b* and 412*c*, the zone with the highest average reading is selected. At decision 414, an inquiry is made as to the location of the sensors 55 which have generated the sensors readings. If all of the sensor readings are from sensors 55 within a predetermined area, then at block 416, the real-time location of the object 100 is determined based on an analysis of the sensor readings from sensors 55 within the predetermined area. Once the real-time location is determined, the location can be inputted into a location database for dissemination to users of the system 50 in the future.

The server 65 can also inquire if the new calculated location is consistent with available data for the object 100. The available data includes the motion sensor state of the object 100. If the motion sensor has not detected a motion threshold of the object 100, then that is one indication that the new calculated location is in error. However, if the motion sensor has detected movement (a motion threshold) of the object 100, then that is one indication that the new calculated location is correct. Additional data includes recently calculated locations for the object 100 which are available from database 426. Yet further data available is data from the possible hypotheses database 428. The possible hypotheses database includes data such as the timing between the last calculated location and the new calculated location. If the object 100 has moved one end of the facility 70 to another end of the facility 70 within seconds, then the new calculated location may be in error. If the inquiry determines that the newly calculated location is correct, then the location is inputted to the location database for dissemination to users of the system to locate the object 100. If the inquiry determines that the newly calculated location is incorrect, then the new calculated location is held as an unproven hypothesis.

The following example illustrates the information that is utilized and eliminated in practicing the present invention.

TABLE ONE

| Sensor # | Signal Strength dB | Link Quality | Timestamp | Sensor Location (floor/region) |
|---|---|---|---|---|
| 1 | −95 | 240 | 09/14/06 11:22:35 | 5/B |
| 2 | −10 | 50 | 09/14/06 11:22:35 | 4/C |
| 3 | −20 | 60 | 09/14/06 11:22:36 | 4/C |
| 4 | −25 | 70 | 09/14/06 11:22:35 | 4/C |
| 5 | −40 | 80 | 09/14/06 11:22:36 | 4/C |
| 6 | −50 | 125 | 09/14/06 11:22:36 | 4/C |
| 7 | −70 | 150 | 09/14/06 11:22:36 | 4/D |
| 8 | −80 | 200 | 09/14/06 11:22:36 | 4/D |
| 9 | −90 | 220 | 09/14/06 11:22:37 | 4/E |
| 10 | −95 | 240 | 09/14/06 11:22:37 | 4/E |

TABLE TWO

| Sensor # | Signal Strength dB | Link Quality | Timestamp | Sensor Location (floor/region) |
|---|---|---|---|---|
| 1 | −50 | 125 | 09/14/06 11:22:38 | 5/B |
| 2 | | | | |
| 3 | | | | |
| 4 | | | | |
| 5 | | | | |
| 6 | | | | |
| 7 | −35 | 80 | 09/14/06 11:22:39 | 4/D |

TABLE TWO-continued

| Sensor # | Signal Strength dB | Link Quality | Timestamp | Sensor Location (floor/region) |
|---|---|---|---|---|
| 8 | −40 | 100 | 09/14/06 11:22:39 | 4/D |
| 9 | −45 | 110 | 09/14/06 11:22:40 | 4/E |
| 10 | −50 | 125 | 09/14/06 11:22:40 | 4/E |

TABLE THREE

| Sensor # | Signal Strength dB | Link Quality | Timestamp | Sensor Location (floor/region) |
|---|---|---|---|---|
| 1 | −25 | 50 | 09/14/06 11:22:41 | 5/B |
| 2 | | | | |
| 3 | | | | |
| 4 | | | | |
| 5 | | | | |
| 6 | | | | |
| 7 | | | | |
| 8 | | | | |
| 9 | | | | |
| 10 | −25 | 50 | 09/14/06 11:22:43 | 4/E |

TABLE FOUR

| Floor | Average Reading per Floor |
|---|---|
| 2 | N/A |
| 3 | −120 |
| 4 | −30 |
| 5 | −85 |

TABLE FIVE

| Region | Peaks | Average Reading per Region |
|---|---|---|
| C | −20 | −20 |
| D | −10 | −70 |
| E | −70 | −95 |

As shown in Table One, the signal strength from each tag 60 is provided dBm with a full strength value of zero, which is a ratio of power relative to 1 milli-Watt. The Link Quality value is provided as a scaled number from 0 to 255 with 255 being the best link quality and 0 being the worst link quality. The timestamp is a date stamp of the time and date that the signal is received by the sensor 55. The sensor location is preferably a floor and region on the floor. In a preferred embodiment, the regions on the floors overlap each other. The regions are preferably determined based on the facility 70.

In Table One, ten readings from sensors 55 positioned on various floors of the facility 70. Each of the readings is transmitted at a first power level from a single tag 60 to the sensors 60. The sensors 60 transmit the data from the tag 60 to the server 65 via bridges 56. The server 65 uses the data to calculate the location of the object 100 as discussed. The sensor location may also be provided in terms of a X-Y position which is based on a floor plan image of each floor of the facility 70. The X-Y position may be based on the pixel location on the image of the floor plan.

As shown in Table Two, the signals transmitted at a second power level, which is 50% of the first power level, allow for fewer signals to be read by the sensors 55. As Table Three, the signals transmitted at a third power level, which is 25% of the first power level, allow for only two signals to be read by the sensors 55.

The average reading from all of the sensors 55 on each floor is provided in Table Four. More specifically, if the fifth floor has ten sensors 55 that each received a signal from a specific tag 60, then the readings from those ten sensors 55 are averaged to obtain the average reading per floor value provided in Table Four. The readings from the floor with the highest value are then further processed to determine the location of the object 100. The readings from the sensors 55 on the other floors are eliminated from the calculation for the location of the object 100.

The average reading from all of the sensors 55 in each region on the selected floor is provided in Table Five. As mentioned above, the regions preferably overlap so that a single sensor 55 may be in two or more regions, and used in the average reading for both regions. The peak reading for each region is also set forth in Table Five. In an alternative embodiment, if the peak reading exceeds a threshold, then that region is selected even if the average readings for that region are less than another region. In calculating the location of the object 100, the highest readings within a selected region are used for the calculation. The number of readings used preferably ranges from 2 to 10, and is most preferably 3 to 5. The more readings used in the calculation, the longer the processing time for the calculation. Thus, using 10 readings may provide a more accurate location, however, the processing time will be longer than using 3 readings. In a preferred embodiment, a radial basis function is utilized in calculating the location of the object 100. The location of the object 100 is preferably conveyed as an XY coordinate on a floor plan image of the facility 70. Thus, mitigation of multipath errors is accomplished by comparison of positions calculated at different tag transmission power levels wherein lower tag transmission power levels eliminate strong remote readings due to multipath that can skew a positioning calculation for a tag in a facility such that large differences in the positions of tags in a facility calculated at each unique tag transmission power level indicates multipath errors and position calculations for a tag calculated at lower tag transmission power levels should be favored in determining the true position of the tag within the facility.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim:

1. A method for determining a real-time location of an object within an indoor facility, the method comprising:

generating a first reading set from a primary plurality of sensor readings transmitted from a tag at the first energy level, the tag attached to the object;

sorting the first reading set by a plurality of primary physical regions;

selecting a first primary physical region of the plurality of primary physical regions, the first physical region composed of a first plurality of sensor readings having a highest average signal strength from the first reading set;

sorting the first plurality of sensor readings into a second plurality of sensor readings, the second plurality of sensor readings corresponding to a zone within the first primary physical region;

selecting a selected primary zone having the highest average reading from the second plurality of sensor readings;

calculating the first preliminary location of the object from a plurality of the highest sensor readings from the second plurality of sensor readings corresponding to the selected primary zone;

calculating a second preliminary location of the object from a second plurality of sensor readings generated at a second power level, the second power level less than the first power level; and analyzing the first preliminary location of the object and the second preliminary location of the object to determine a real-time location of the object within the indoor facility.

2. The method according to claim 1 wherein the second power level is 50% of the first power level.

3. The method according to claim 1 wherein calculating the second preliminary location comprises:

generating a second reading set from a secondary plurality of sensor readings transmitted from the tag at the second energy level;

sorting the second reading set by a plurality of secondary physical regions;

selecting a first secondary physical region of the plurality of secondary physical regions, the first secondary physical region composed of a first plurality of sensor readings having a highest average signal strength from the second reading set;

sorting the first plurality of sensor readings into a second plurality of sensor readings, the second plurality of sensor readings corresponding to a zone within the first secondary physical region;

selecting a selected secondary zone having the highest average reading from the second plurality of sensor readings; and calculating the second preliminary location of the object from a plurality of the highest sensor readings from the second plurality of sensor readings corresponding to the selected secondary zone.

4. The method according to claim 1 wherein the first power level is 1 milli-Watt, the second power level is 0.5 milli-Watt, and third power level is 0.25 milli-Watt.

* * * * *